US012782533B2

(12) United States Patent
Lin et al.

(10) Patent No.: US 12,782,533 B2
(45) Date of Patent: Nov. 3, 2026

(54) AUTOMOTIVE SONAR AND AUTOMOTIVE SONAR ASSEMBLY METHOD

(71) Applicant: TUNG THIH ELECTRONIC CO., LTD., Taoyuan City (TW)

(72) Inventors: Chi-Sheng Lin, Taoyuan City (TW); Cheng-Jun Huang, Taoyuan City (TW)

(73) Assignee: TUNG THIH ELECTRONIC CO., LTD., Taoyuan City (TW)

( * ) Notice: Subject to any disclaimer, the term of this patent is extended or adjusted under 35 U.S.C. 154(b) by 203 days.

(21) Appl. No.: 18/789,729

(22) Filed: Jul. 31, 2024

(65) Prior Publication Data

US 2025/0306191 A1 Oct. 2, 2025

(30) Foreign Application Priority Data

Mar. 29, 2024 (TW) ................................ 113112065

(51) Int. Cl.

*G01S 15/93* (2020.01)
*G01S 7/521* (2006.01)
*G01S 15/931* (2020.01)

(52) U.S. Cl.

CPC ............ *G01S 7/521* (2013.01); *G01S 15/931* (2013.01)

(58) Field of Classification Search

CPC ............................... G01S 7/521; G01S 15/931
See application file for complete search history.

(56) References Cited

U.S. PATENT DOCUMENTS

2020/0393564 A1* 12/2020 Sumi ....................... G01S 15/08
2024/0051474 A1* 2/2024 Tietje ...................... B60R 11/00

FOREIGN PATENT DOCUMENTS

| | | | | | |
|---|---|---|---|---|---|
| DE | 102017114080 | A1 * | 12/2018 | ........... | G01S 15/931 |
| DE | 102019117315 | A1 * | 12/2020 | ............. | G01S 7/521 |
| DE | 102023211573 | A1 * | 5/2025 | ............. | G01S 7/521 |
| EP | 4418008 | A2 * | 8/2024 | ............. | G01D 11/24 |
| WO | WO-2021035022 | A1 * | 2/2021 | ............. | G01S 7/521 |
| WO | WO-2021244445 | A1 * | 12/2021 | ............. | G01S 7/521 |

* cited by examiner

*Primary Examiner* — Krystine E Breier

(57) ABSTRACT

An automotive sonar includes a sensor, a front cover and a terminal seat. The sensor includes a plurality of front cover clamping parts, and the front cover clamping parts are arranged at unequal intervals along a circumference; the front cover includes a plurality of sensor clamping parts, and the sensor clamping parts are suitable for clamping with the front cover clamping parts; the terminal seat includes a terminal seat body and a connecting terminal, wherein the terminal seat body forms a front opening and an accommodating space, the accommodating space is communicated to the front opening, and suitable for accommodating at least a part of the sensor, the connecting terminal is configured in the accommodating space. The disclosure further provides an assembly method suitable for the automotive sonar.

8 Claims, 15 Drawing Sheets

120

200

AUTOMOTIVE SONAR AND AUTOMOTIVE SONAR ASSEMBLY METHOD

CROSS-REFERENCE TO RELATED APPLICATION

This non-provisional application claims priority under 35 U.S.C. § 119(a) on Patent Application No. 113112065 filed in Taiwan, R.O.C. on Mar. 29, 2024, the entire contents of which are hereby incorporated by reference.

BACKGROUND OF THE INVENTION

1. Field of the Invention

The present disclosure provides an automotive sonar and an automotive sonar assembly method, and in particular relates to an automotive sonar with elements inside and an automotive sonar assembly method suitable for assembling the automotive sonar.

2. Description of the Related Art

Cars are one of the indispensable means of transportation in people's lives. Generally speaking, in order to avoid collisions between an automobile and other automobiles or obstacles during driving or reversing, automotive sonars that can detect the distance between the automotive body and other automobiles or obstacles are usually equipped around the automotive body, and non-contact detection technologies such as ultrasound and light sensing are used to inform the driver of the safety distance when driving or reversing in real time, so as to avoid damage to the automotive body and the derivative safety problems.

BRIEF SUMMARY OF THE INVENTION

Taking the ultrasonic automotive sonar as an example, it may include a sensor (transducer) that emits and receives ultrasonic signals, and a front cover that prevents the sensor from being collided by external objects or intruded by foreign objects (such as rain and snow water), and a terminal seat that accommodates the sensor. When assembling a sonar, the sensor and front cover are usually moved back from the front side of the terminal seat in place. However, if there are other elements (such as connecting terminals) installed in the accommodating space, although they can be assembled through automated methods on the market, the cost and development difficulty of automated equipment are high, and misalignment is prone to occur during the assembly process.

The inventor devoted himself to careful research and developed an automotive sonar with elements inside and an automotive sonar assembly method suitable for assembling the automotive sonar, in order to improve the assembly efficiency and increase the product yield.

The present disclosure provides an automotive sonar, including a sensor, a front cover and a terminal seat. The sensor includes a plurality of front cover clamping parts, and the front cover clamping parts are arranged at unequal intervals along a circumference; the front cover includes a plurality of sensor clamping parts, and the sensor clamping parts are suitable for clamping with the front cover clamping parts; the terminal seat includes a terminal seat body and a connecting terminal, wherein the terminal seat body forms a front opening and an accommodating space, the accommodating space is communicated to the front opening, and suitable for accommodating at least a part of the sensor, the connecting terminal is configured in the accommodating space.

In one embodiment, the connecting terminal is precast in the accommodating space or integrally formed with the terminal seat body.

In one embodiment, the sensor further includes at least one terminal seat positioning part, the terminal seat body includes at least one sensor positioning part, and the sensor positioning part is suitable for clamping with the terminal seat positioning part.

In one embodiment, the automotive sonar is suitable for assembling through a carrier, the carrier forms an assembly groove, and the assembly groove includes a front cover accommodating groove and a sensor accommodating groove, wherein the sensor accommodating groove is concave relative to a bottom surface of the front cover accommodating groove. In addition, sizes of the front cover and the sensor respectively correspond to the front cover accommodating groove and the sensor accommodating groove.

In one embodiment, the automotive sonar is suitable for assembling through a carrier, the carrier includes a limiting feature, the terminal seat body includes a limiting part, and the limiting part is suitable for clamping with the limiting feature.

Besides, the disclosure further provides an automotive sonar assembly method, including the following steps: providing a carrier, a sensor, a front cover and a terminal seat; configuring the front cover in an assembly groove of the carrier; clamping a plurality of front cover clamping parts of the sensor and a plurality of sensor clamping parts of the front cover with each other, wherein the front cover clamping parts are arranged at unequal intervals along a circumference; and accommodating at least a part of the sensor in an accommodating space of the terminal seat through a front opening of the terminal seat, wherein the sensor is spaced apart from a connecting terminal in the accommodating space.

In one embodiment, the connecting terminal is precast in the accommodating space or integrally formed with a terminal seat body of the terminal seat.

In one embodiment, the automotive sonar assembly method further includes: clamping at least one terminal seat positioning part of the sensor and at least one sensor positioning part of the terminal seat with each other.

In one embodiment, the automotive sonar assembly method further includes: clamping a limiting feature of the carrier and a limiting part of the terminal seat with each other.

Accordingly, when the automotive sonar is assembled through the automotive sonar assembly method of the present disclosure, the front cover clamping parts and the sensor clamping parts can be clamped with each other, and because the front cover clamping parts are arranged at unequal intervals along the circumference, the installation that elements are misaligned from each other can be prevented in the automated assembly process, the assembly efficiency is greatly improved and the product yield is increased, so that it is suitable for the automotive sonar that is configured with a connecting terminal inside.

In order to facilitate the above features and advantages of the present disclosure to be more obvious and easy to understand, embodiments specially given together with the attached drawings for the detailed description of the present disclosure are provided as below.

DETAILED DESCRIPTION OF THE INVENTION

Figure 1:
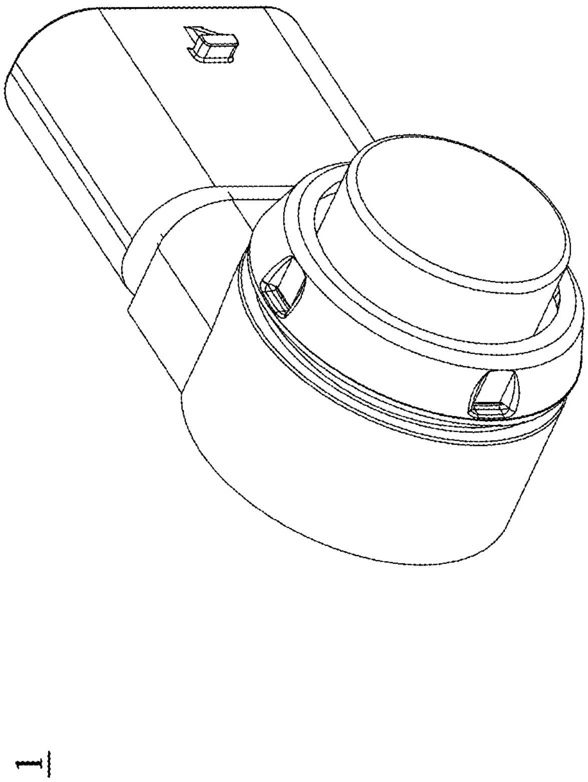
FIG. 1 is a schematic perspective view of an automotive sonar of one embodiment of the present disclosure.

The aforementioned and other technical contents, characteristics and effects of the present disclosure can be clearly presented by the detailed description of preferable embodiments together with the attached drawings. It is worth mentioning that the direction terms mentioned in the following embodiments, such as: top, bottom, left, right, front or rear are only referred to the direction of the drawings. Therefore, the directional terms used are intended to illustrate, not to limit, the disclosure. In addition, in the following embodiments, the same or similar elements will use the same or similar reference numerals.

Figure 2:
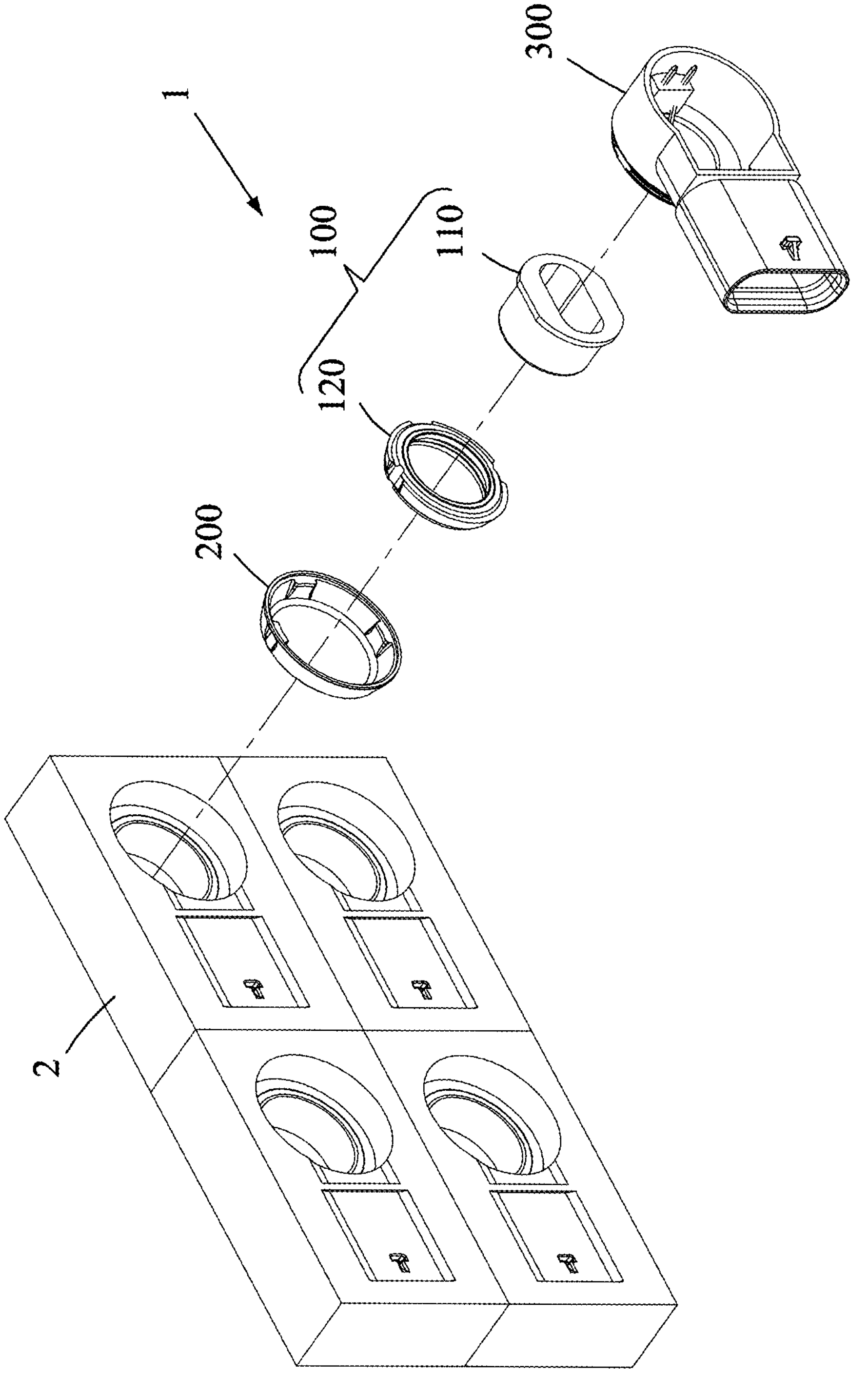
FIG. 2 is a schematic exploded view of the automotive sonar in FIG. 1.

Referring to FIGS. 1 and 2, FIG. 1 is a schematic perspective view of an automotive sonar of one embodiment of the present disclosure, and FIG. 2 is a schematic exploded view of the automotive sonar in FIG. 1. The automotive sonar 1 of the present embodiment, for example, is an ultrasonic automotive sonar, suitable for assembling through a carrier 2. When carrying out assembly operations, a single carrier 2 may be used, and a plurality of automotive sonars 1 may be assembled simultaneously by using a plurality of carriers 2 at one time as shown in FIG. 2, and the carrier 2 may be a fixed mold or a moving mechanism installed on a production line, and the present disclosure does not limit thereto.

On the other hand, the automotive sonar 1 includes a sensor 100, a front cover 200 and a terminal seat 300, wherein the sensor 100, for example, is an ultrasonic transducer, which is used for transmitting or receiving ultrasonic waves, and detects the distance between the installed automobile and other adjacent automobiles or obstacles; the front cover 200 is suitable for assembling with the sensor 100 and is used for preventing the sensor 100 from colliding with external objects, or polluting substances such as rain and snow water from intruding the inside of the sensor; the terminal seat 300 is suitable for accommodating at least a part of the sensor 100, and the sensor 100 and the front cover 200 are installed in the automobile through the terminal seat 300, and the received signal can be transmitted to the user in the automobile through the terminal seat 300, or the power required for the operation of the sensor 100 can be obtained from the automobile.

Preferably, the sensor 100 may include a sensing body 110 and a joint piece 120, wherein the material of the sensing body 110 is aluminum metal or aluminum alloy for example, and is suitable for combining with the front cover 200 through the joint piece 120; the material of the joint piece 120, for example, is silica gel and has flexibility, that is, when assembling the sensor 100 and the front cover 200, the sensing body 110 and the joint piece 120 may be assembled first, and then the joint piece 120 attached with the sensing body 110 is assembled with the front cover 200, so that the efficiency of combining the sensor 100 and the front cover 200 can be improved. However, in some other possible embodiments, the sensing body 110 and the joint piece 120 may also be an inseparable single component, that is, the structure of the sensor 100 itself can be divided into a part for sensing and a part suitable for assembling with other elements, and the present disclosure does not limit thereto.

Figure 3:
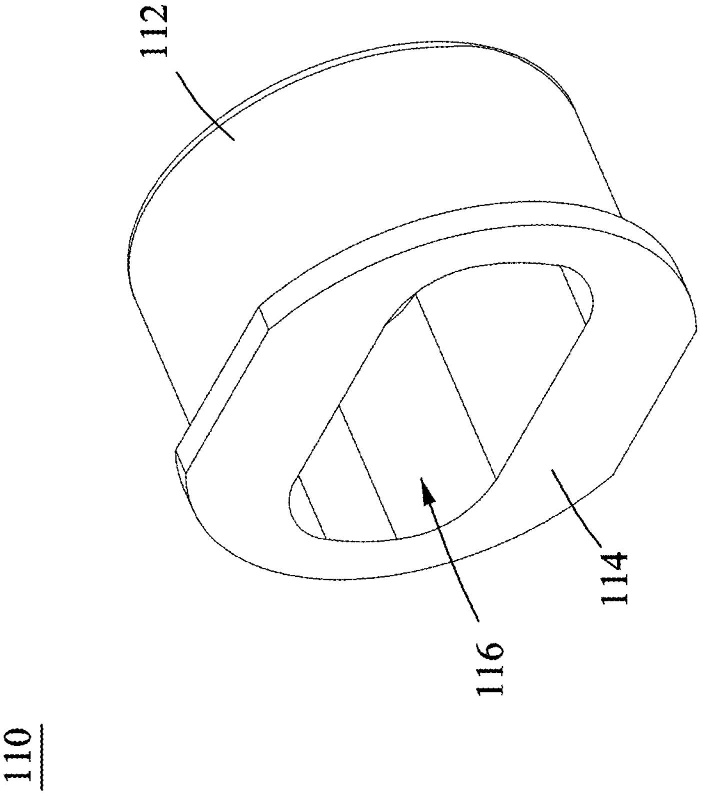
FIG. 3 is a schematic perspective view of the sensing body in FIG. 2.

Referring to FIG. 3, FIG. 3 is a schematic perspective view of the sensing body in FIG. 2. In detail, the sensing body 110 may include a shell 112 and a joint part 114, wherein the shell 112, for example, is a cylindrical shell, the joint part 114, for example, is a component fixed at one end of the shell 112, the shell 112 and the joint part 114 together form a chamber 116, and the chamber 116 can be used to accommodate an element that generates vibration through an electrical effect and thereby transmits or detects an ultrasonic signal.

Figure 4:
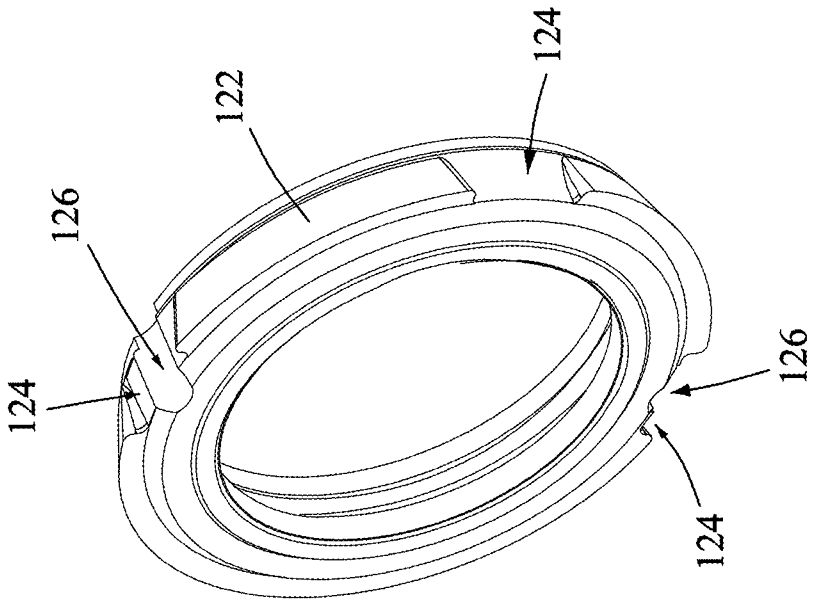
FIG. 4 is a schematic perspective view of the joint piece in FIG. 2.
Figure 5:
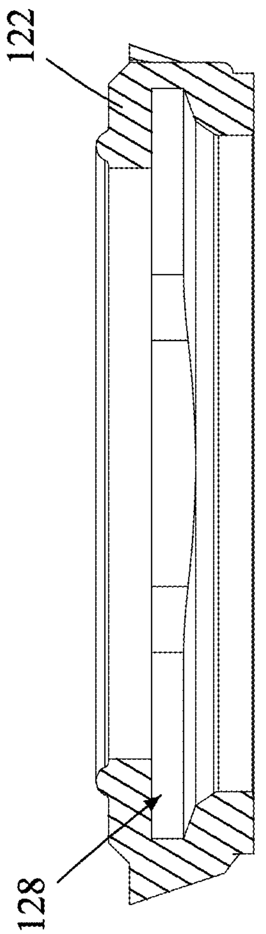
FIG. 5 is a schematic cross-sectional view of FIG. 4.

Referring to FIG. 4 and FIG. 5, FIG. 4 is a schematic perspective view of the joint piece in FIG. 2, and FIG. 5 is a schematic cross-sectional view of FIG. 4. On the other hand, the joint piece 120 includes a joint body 122, a plurality of front cover clamping parts 124 and at least one terminal seat positioning part 126, wherein the front cover clamping parts 124 are arranged at unequal intervals along a circumference of the joint body 122. In the present embodiment, the front cover clamping parts 124, for example, are recesses, the number is three, and they are formed in the top side, the right side and the bottom side of the joint body 122 in FIG. 4, and are suitable for clamping and positioning with the front cover 200 in the assembly process of the automotive sonar 1; and the terminal seat positioning parts 126, for example, are grooves that are further concave relative to a bottom surface of the front cover clamping part 124, the number is three, and they are formed in the top side and the bottom side of the joint body 122 in FIG. 4, and are suitable for clamping and positioning with the terminal seat 300 in the assembly process of the automotive sonar 1.

As shown in FIG. 5, the joint body 122 may further form an accommodating groove 128, wherein the shape and size of the accommodating groove 128 correspond to the joint part 114. When the sensing body 110 and the joint piece 120 are combined with each other, the joint part 114 can be embedded in the accommodating groove 128, so that the sensing body 110 and the joint piece 120 are tightly matched.

Figure 6:
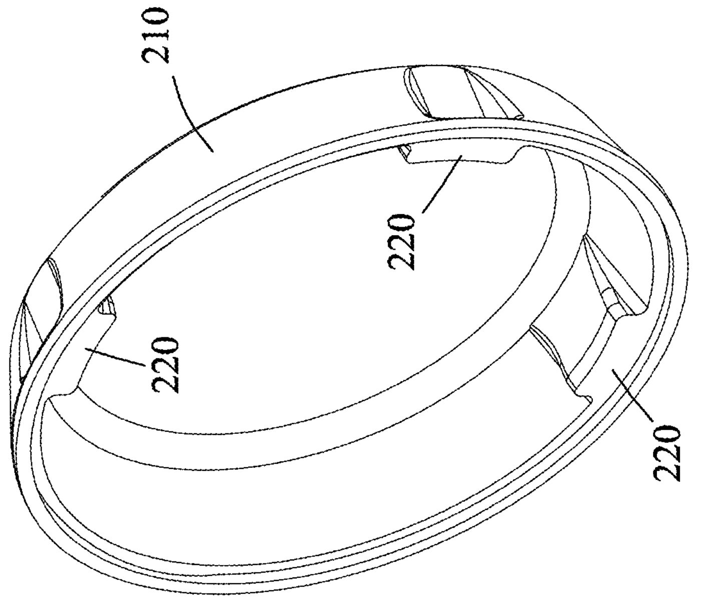
FIG. 6 is a schematic perspective view of the front cover in FIG. 2.

Referring to FIG. 6, FIG. 6 is a schematic perspective view of the front cover in FIG. 2. In the present embodiment, the front cover 200, for example, is an annular member made of plastic material and includes a front cover body 210 and a plurality of sensor clamping parts 220, wherein the sensor clamping parts 220, for example, are projections with shape and size corresponding to the front cover clamping parts 124, the number is three, and they are arranged at unequal intervals along a circumference of the front cover body 210.

Figure 7:
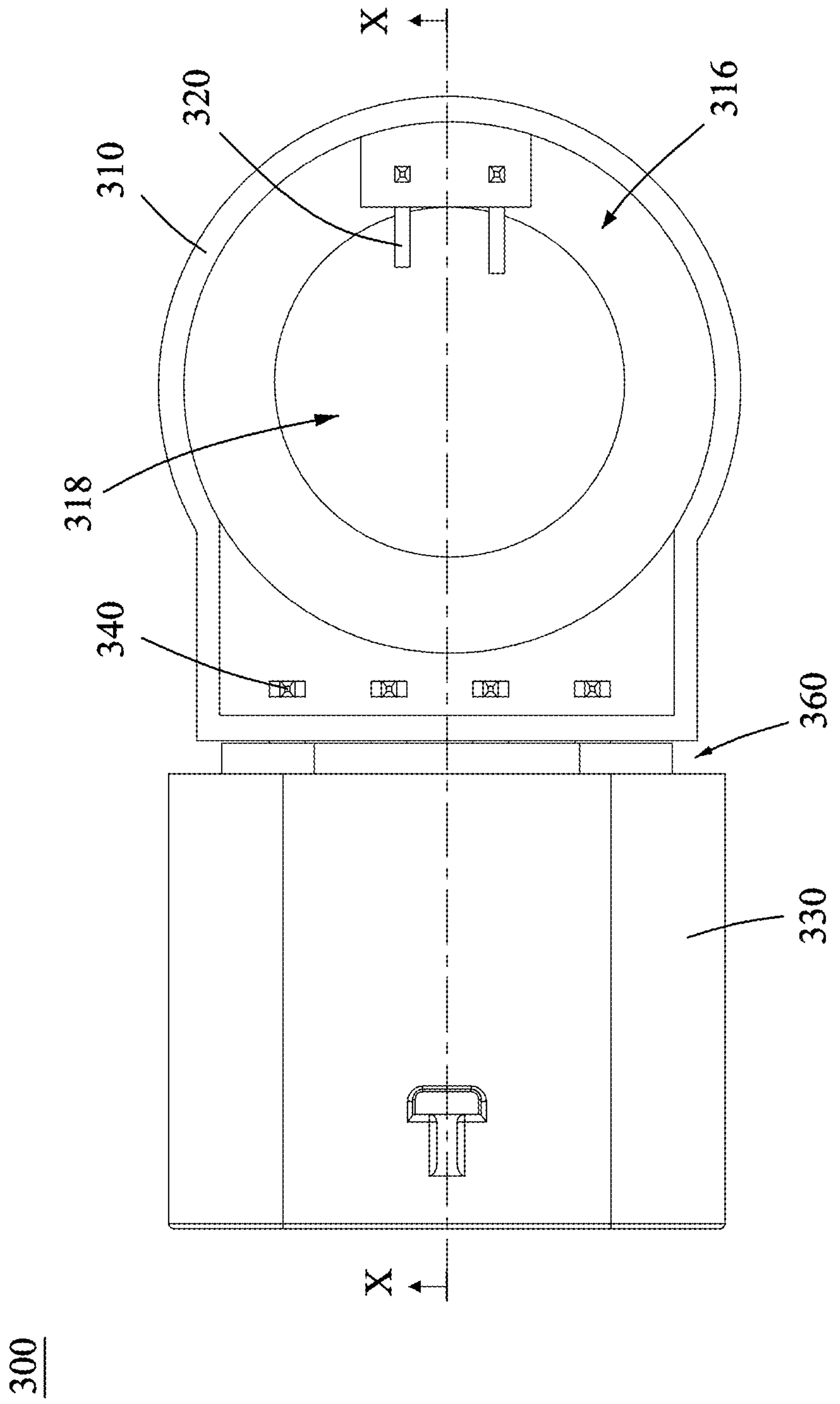
FIG. 7 is a schematic top view of the terminal seat in FIG. 2.
Figure 8:
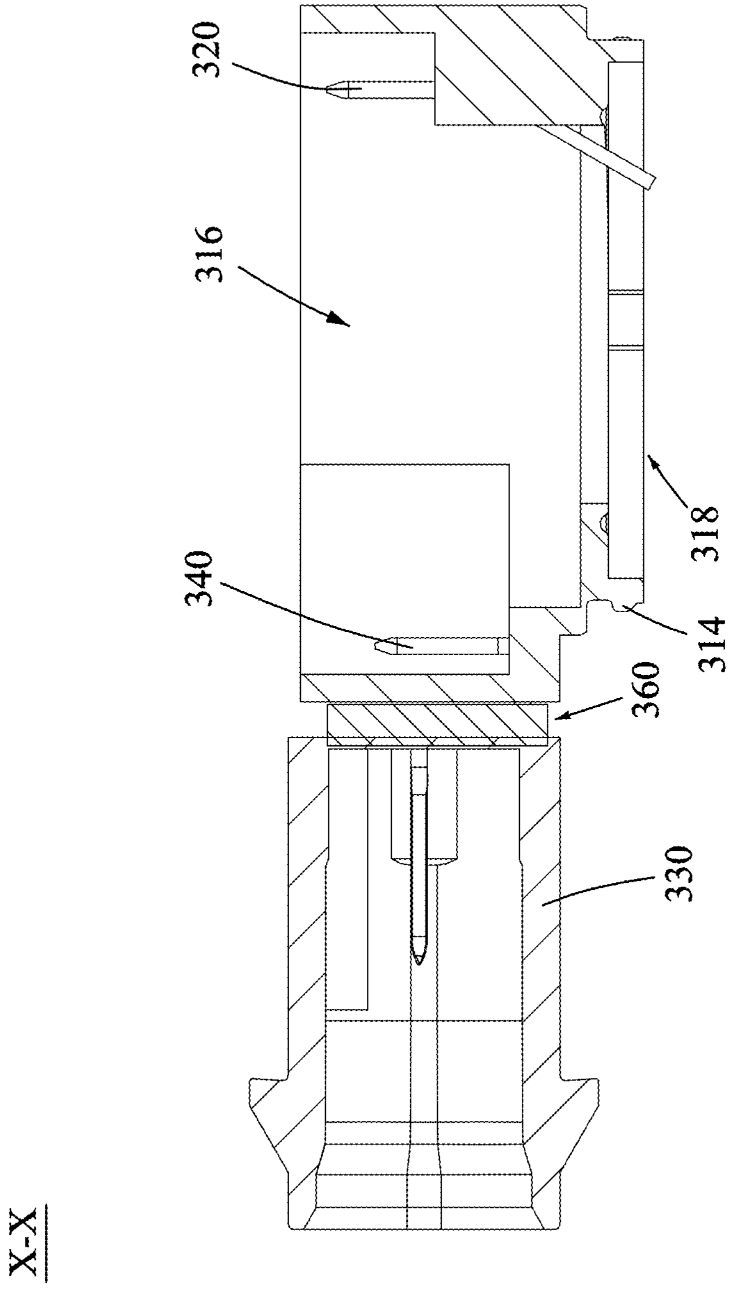
FIG. 8 is a schematic cross-sectional view of FIG. 7 along the X-X profile.

Referring to FIG. 7 and FIG. 8, FIG. 7 is a schematic top view of the terminal seat in FIG. 2, and FIG. 8 is a schematic cross-sectional view of FIG. 7 along the X-X profile. As shown in figures, the terminal seat 300 includes a terminal seat body 310 and a connecting terminal 320, wherein the terminal seat body 310 forms an accommodating space 316 and a front opening 318, the accommodating space 316 is communicated to the front opening 318, the connecting terminal 320 is configured in the accommodating space, and a part of the connecting terminal 320 is penetratingly provided in the front opening 318. In the present embodiment, the connecting terminal 320, for example, is a pin for electrically connecting with the sensing element of the sensor 100, which may be precast in the accommodating space 316 or integrally formed with the terminal seat body 310 in the process of the terminal seat body 310. However, in other possible embodiments, it is also possible to configure a socket for inserting the connecting terminal 320 only in the inside of the terminal seat body 310, and the connecting terminal 320 can be inserted into the socket, and the present disclosure does not limit thereto.

Preferably, the terminal seat 300 may also include a connecting part 330, wherein the connecting part 330 is a hollow base used for fixedly connecting with the automobile and is fixed at one end of the terminal seat body 310, the size and shape may be customized according to the difference of the automobile or the installation position, and a limiting part 360 can be formed between the terminal seat body 310 and the connecting part 330, and in the present embodiment, the limiting part 360 is an annular recess that is concave relative to the surfaces of the terminal seat body 310 and the connecting portion 330, during the installation of automotive sonar 1, it can be located through the limiting part 360 and the carrier 2, and the details of this part will be detailed below. In addition, the terminal seat body 310 may also include at least one sensor positioning part 314, in the present embodiment, the sensor positioning part 314, for example, is a convex point protruding radially outward from a part adjacent to the front opening 318 of the terminal seat body 310, and the number and shape correspond to the terminal seat positioning part 126.

In some possible embodiments, the terminal seat 300 may further include at least one auxiliary connecting terminal 340, wherein the auxiliary connecting terminal 340 may be the same pin or connecting pin as the connecting terminal 320, and is used for transmitting electrical energy to the sensor 100 or transmitting the signal detected by the sensor 100 to the interior of the automobile or other control units connected in series with the sensor 100.

Figure 9:
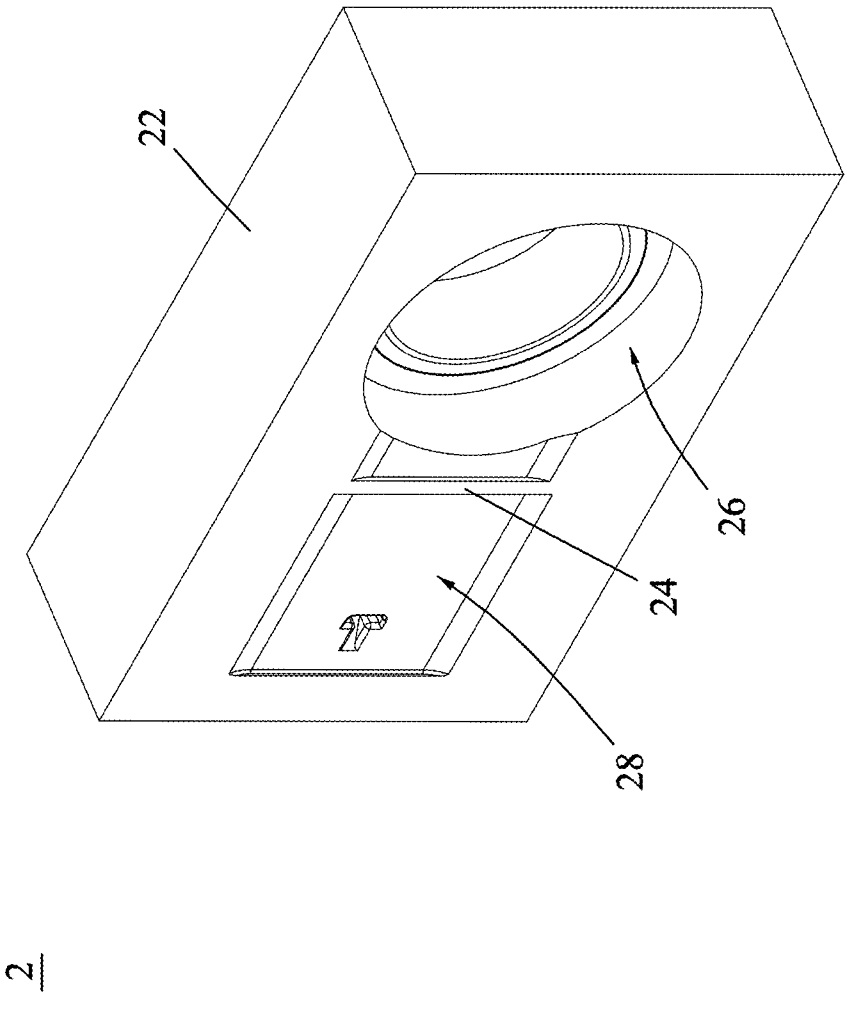
FIG. 9 is a schematic perspective view of the carrier in FIG. 2.

Referring to FIG. 9, FIG. 9 is a schematic perspective view of the carrier in FIG. 2. The carrier 2 of the present embodiment includes a carrier body 22, and the carrier body 22 can form an assembly groove 26 and an auxiliary assembly groove 28, wherein the assembly groove 26 is suitable for accommodating a part of the terminal seat 300, a front cover 200 and a sensor 100, and the auxiliary assembly groove 28, for example, is a shallow groove that is slightly concave relative to the surface of the carrier body 22, and is used for assisting in the limiting during the assembly process of the automotive sonar 1, so as to avoid the relative displacement or rotation of the automotive sonar 1 relative to the carrier 2. In the present embodiment, the carrier body 22 further forms a limiting feature 24 between the assembly groove 26 and the auxiliary assembly groove 28, wherein the limiting feature 24 is a convex rib whose size and shape correspond to the limiting part 360 for clamping with the limiting part 360.

Figure 10:
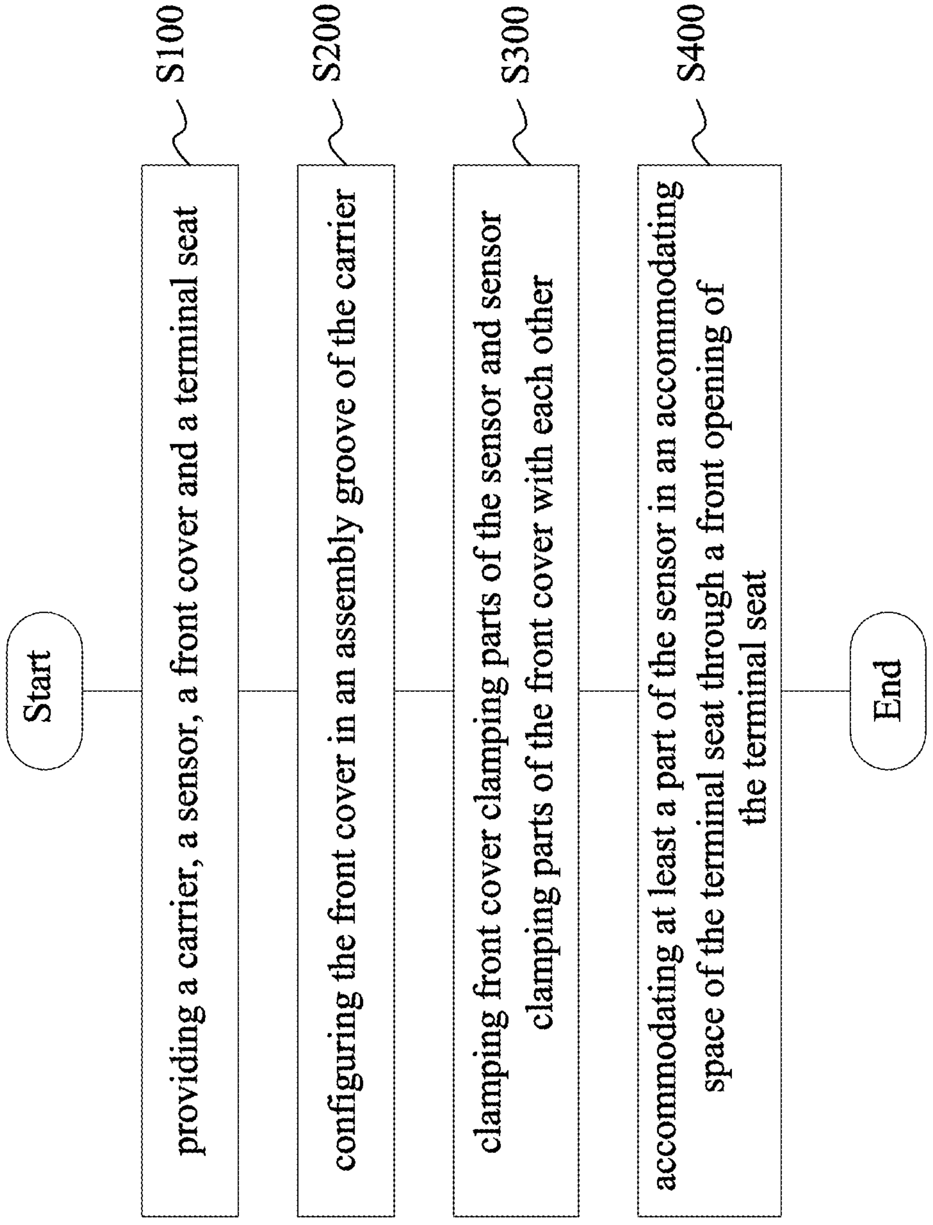
FIG. 10 is a schematic flowchart of steps of the automotive sonar assembly method of an embodiment of the present disclosure.

Referring to FIG. 10 to FIG. 15, FIG. 10 is a schematic flowchart of steps of the automotive sonar assembly method of an embodiment of the present disclosure, and FIG. 11 to FIG. 15 are the corresponding schematic views of assembly according to the steps in the automotive sonar assembly method. As shown in FIG. 10, the automotive sonar assembly method of the present embodiment includes the following steps: providing a carrier, a sensor, a front cover and a terminal seat (step S100); configuring the front cover in an assembly groove of the carrier (step S200); clamping a plurality of front cover clamping parts of the sensor and a plurality of sensor clamping parts of the front cover with each other, wherein the front cover clamping parts are arranged at unequal intervals along a circumference (step S300); and accommodating at least a part of the sensor in an accommodating space of the terminal seat through a front opening of the terminal seat, wherein the sensor is spaced apart from a connecting terminal in the accommodating space (step S400).

Figure 11:
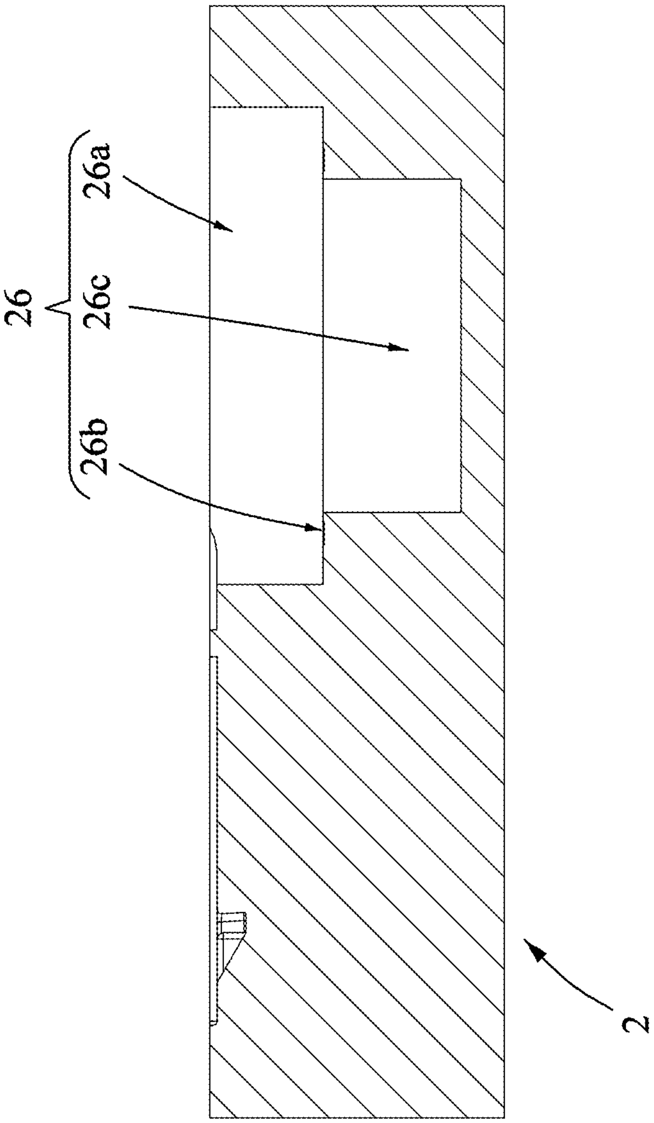
FIG. 11 is a schematic cross-sectional view of providing a carrier according to step S100.

As shown in FIG. 11, if the automotive sonar 1 is to be assembled, the carrier 2 may be provided, wherein the assembly groove 26 of the carrier 2 may include a front cover accommodating groove 26*a*, a front cover positioning groove 26*b* and a sensor accommodating groove 26*c*, wherein the size and groove depth of the front cover accommodating groove 26*a* correspond to the front cover 200; the front cover positioning groove 26*b*, for example, is an annular shallow groove that is slightly concave relative to a bottom surface of the front cover accommodating groove 26*a*; the sensor accommodating groove 26*c* is a deep groove that is concave relative to the bottom surface of the front cover accommodating groove 26*a*, and is configured in the central part of the front cover accommodating groove 26*a*, and the size and groove depth of the sensor accommodating groove 26*c* correspond to the sensor 100.

Figure 12:
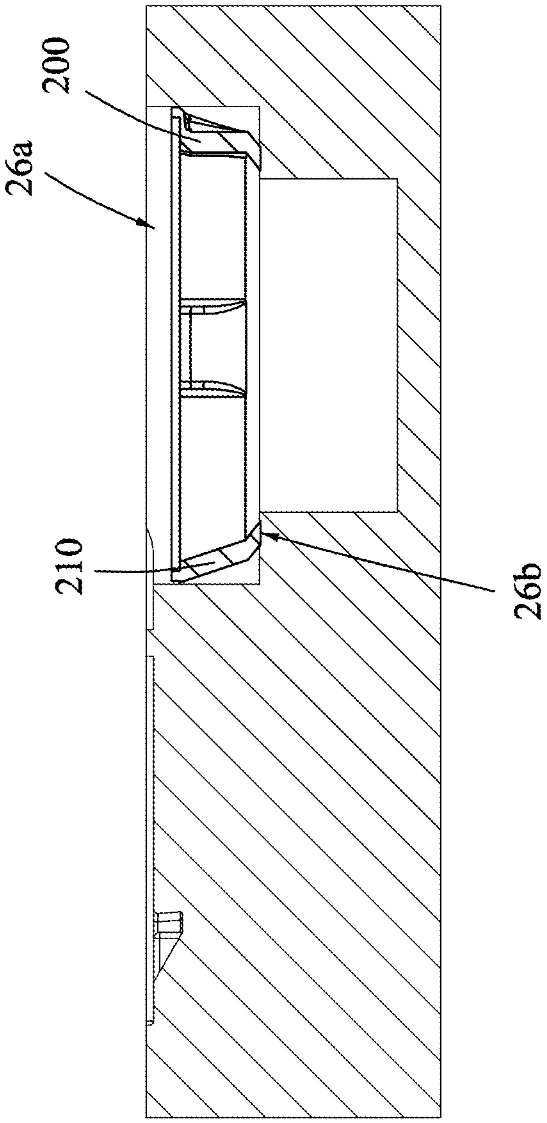
FIG. 12 is a schematic cross-sectional view of configuring the front cover in an assembly groove according to step S200.

After that, the front cover 200 may be configured in the assembly groove 26 as shown in FIG. 12, an outer edge of the front cover body 210 is flush with the periphery wall of the front cover accommodating groove 26*a* at this time, and a front end of the front cover body 210 is embedded in the front cover positioning groove 26*b*. Preferably, the front end of the front cover body 210 and the front cover positioning groove 26*b* can form a corresponding and directional convex point or hole, so that the assembly phase of each automotive sonar 1 can be kept the same when the front cover 200 is configured.

Figure 13:
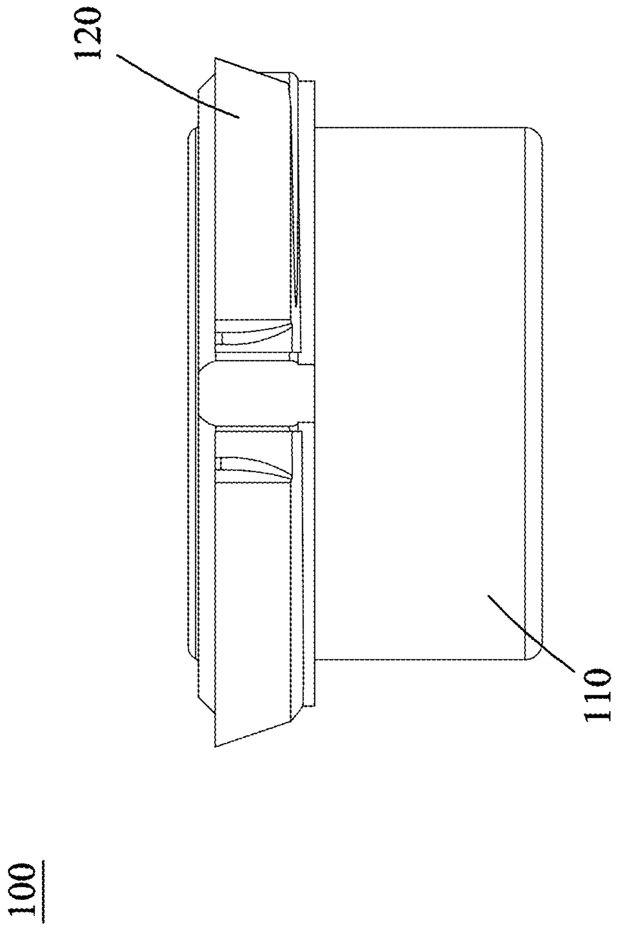
FIG. 13 is a schematic side view of the assembled sensor in FIG. 2.

On the other hand, as shown in FIG. 13, the sensing body 110 and the joint piece 120 can be combined with each other, so that the sensor 100 forms a state suitable for assembling with the front cover 200. Specifically, the manufacturer may slightly extend the deformable joint piece 120 through a special machine, so that the joint part 114 can be embedded in the accommodating groove 128, and thus the sensing body 110 and the joint piece 120 are relatively fixed with each other.

Figure 14:
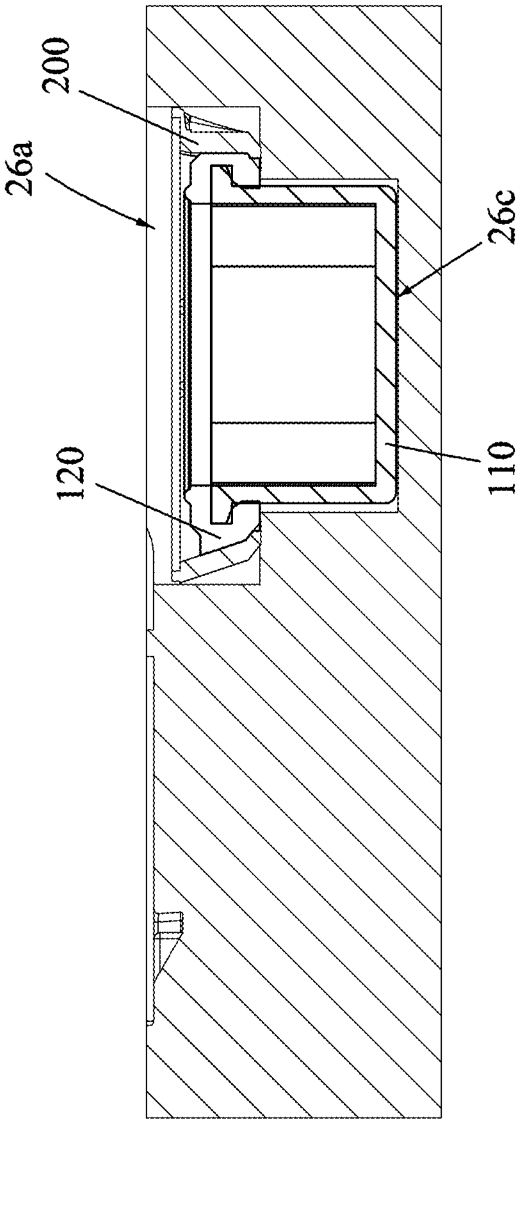
FIG. 14 is a schematic cross-sectional view of assembling the sensor and the front cover according to step S300.

As shown in FIG. 14, the assembled sensor 100 can be placed in the assembly groove 26, so that the front cover clamping parts 124 of the joint piece 120 and the sensor clamping parts 220 of the front cover 200 are clamped with each other. Because the front cover clamping parts 124 and the sensor clamping parts 220 are all arranged at unequal intervals along the circumference, the foolproof effect can be achieved during assembly, and the situation that the sensor 100 and the front cover 200 are misaligned from each other can be avoided, so that the efficiency and accuracy of automated assembly can be improved.

Figure 15:
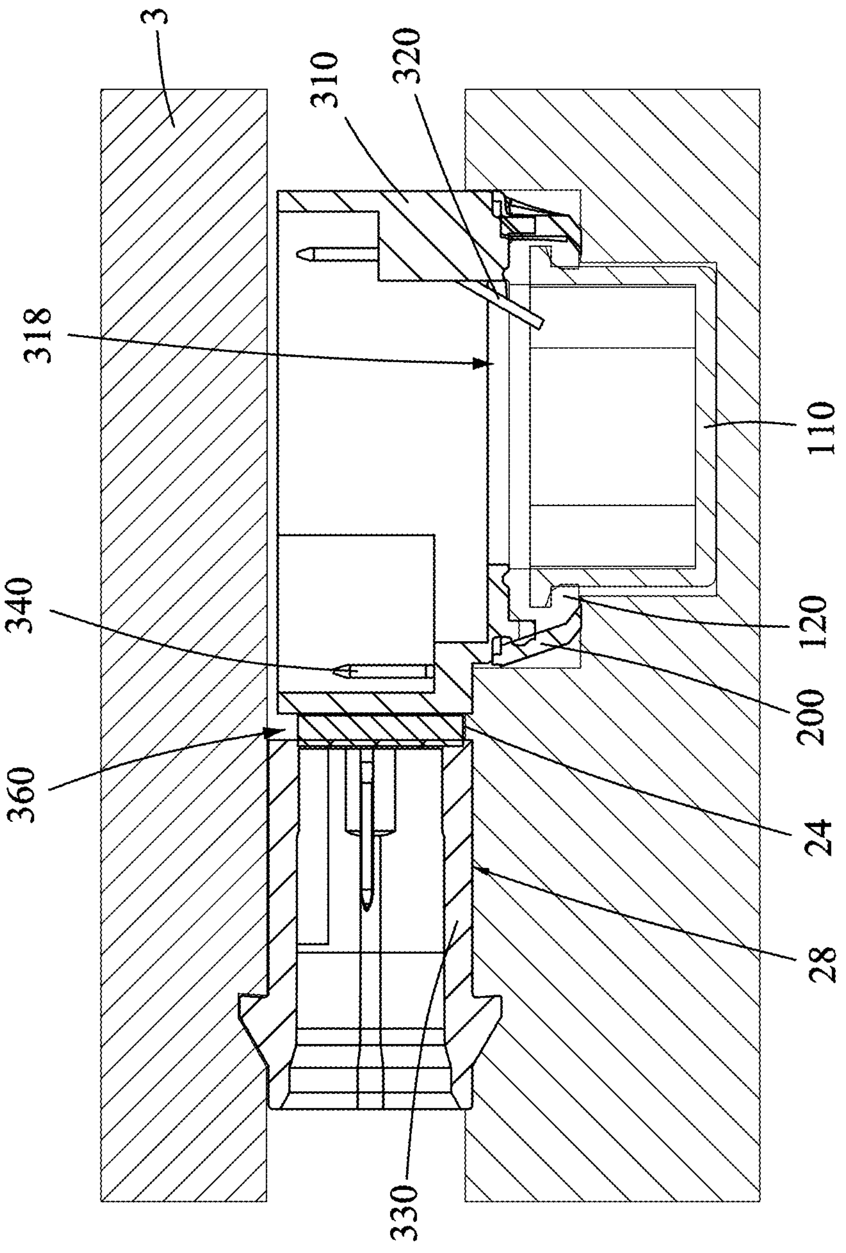
FIG. 15 is a schematic cross-sectional view of assembling the sensor and the terminal seat according to step S400.

As shown in FIG. 15, after the sensor 100 and the front cover 200 are assembled and positioned with each other, the terminal seat 300 can be configured on the carrier 2, the terminal seat positioning part 126 of the joint piece 120 is suitable for clamping with the sensor positioning part 312 of the terminal seat body 310 at this time, a part of the joint piece 120 is accommodated in the accommodating space 316 through the front opening 318 simultaneously, and the sensing body 110 and the connecting terminal 320 are spaced apart. In the present embodiment, because the connecting terminal 320 is integrally formed with the terminal seat body 310, it is difficult to place the sensor 100 and the front cover 200 into the accommodating space 316 from the rear side of the terminal seat body 310. Therefore, through the clamping relationship between the front cover clamping part 124 and the sensor clamping part 220 and the clamping relationship between the terminal seat positioning part 126 and the sensor positioning part 312, the sensor 100, the front cover 200 and the terminal seat 300 can be assembled and combined with each other in the correct phase, thereby improving the assembly efficiency and the product yield.

It should be noted that when the terminal seat 300 is configured on the carrier 2, a part of the connecting part 330 is suitable for being configured in the auxiliary assembly groove 28, and the limiting part 360 can be embedded in the limiting feature 24 of the carrier 2, thereby further limiting the terminal seat 300. After that, through the stamping of pressing die 3, the sensor 100, the front cover 200 and the terminal seat 300 can be tightly combined with each other, and then the subsequent operation can be carried out smoothly.

In the past installation process without the carrier 2, if the sensor 100 and the front cover 200 were to be configured on the terminal seat 300, in order to overcome the effect of gravity, the front part of the terminal seat 300 needs to face upwards and is configured on a bearing surface for assembly, and then the sensor 100 and the front cover 200 are sleeved or embedded therein, not only are elements more difficult to fix, but the terminal seat 300 also needs to be turned over when other control elements are subsequently installed, so that the control element can be placed through the rear opening with a larger caliber, which increases the number of work stations of automated assembly process. Relatively, through the automotive sonar assembly method of the present embodiment, the sensor 100, the front cover 200 and the terminal seat 300 can be combined with each other in the assembly groove 26 of the carrier 2, they can not only be accurately aligned, but the automotive sonar assembly method also does not need to turn over the terminal seat 300, can reduce the work stations and improve the efficiency of the overall assembly.

While the present invention has been described by means of preferable embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention, and the technical features of the above embodiments may be appropriately combined, substituted, omitted and varied without generating conceptual contradictions or structural conflicts. Therefore, the scope of the invention is defined by the claims.

What is claimed is:

1. An automotive sonar, comprising:

a sensor, comprising a plurality of front cover clamping parts, and the plurality of front cover clamping parts are arranged at unequal intervals along a circumference;

a front cover, comprising a plurality of sensor clamping parts, and the plurality of sensor clamping part are suitable for clamping with the plurality of front cover clamping parts; and a terminal seat, comprising:

a terminal seat body, forming a front opening and an accommodating space, the accommodating space is communicated to the front opening, and suitable for accommodating at least a part of the sensor; and a connecting terminal, configured in the accommodating space, wherein the automotive sonar is suitable for assembling through a carrier, the carrier forms an assembly groove, and the assembly groove comprises:

a front cover accommodating groove; and a sensor accommodating groove, being concave relative to a bottom surface of the front cover accommodating groove;

wherein sizes of the front cover and the sensor respectively correspond to the front cover accommodating groove and the sensor accommodating groove.

2. The automotive sonar according to claim 1, wherein the connecting terminal is precast in the accommodating space or integrally formed with the terminal seat body.

3. The automotive sonar according to claim 1, wherein the sensor further comprises at least one terminal seat positioning part, the terminal seat body comprises at least one sensor positioning part, and the at least one sensor positioning part is suitable for clamping with the at least one terminal seat positioning part.

4. The automotive sonar according to claim 1, wherein the carrier comprises a limiting feature, the terminal seat body comprises a limiting part, and the limiting part is suitable for clamping with the limiting feature.

5. An automotive sonar assembly method, comprising the following steps:

providing a carrier, a sensor, a front cover and a terminal seat;

configuring the front cover in an assembly groove of the carrier;

clamping a plurality of front cover clamping parts of the sensor and a plurality of sensor clamping parts of the front cover with each other, wherein the plurality of front cover clamping parts are arranged at unequal intervals along a circumference; and accommodating at least a part of the sensor in an accommodating space of the terminal seat through a front opening of the terminal seat, wherein the sensor is spaced apart from a connecting terminal in the accommodating space.

6. The automotive sonar assembly method according to claim 5, wherein the connecting terminal is precast in the accommodating space or integrally formed with a terminal seat body of the terminal seat.

7. The automotive sonar assembly method according to claim 5, further comprising:

clamping at least one terminal seat positioning part of the sensor and at least one sensor positioning part of the terminal seat with each other.

8. The automotive sonar assembly method according to claim 5, further comprising:

clamping a limiting feature of the carrier and a limiting part of the terminal seat with each other.

* * * * *